US010061508B2

(12) United States Patent
Wild et al.

(10) Patent No.: US 10,061,508 B2
(45) Date of Patent: Aug. 28, 2018

(54) USER INTERFACE AND METHOD FOR ADAPTING A VIEW ON A DISPLAY UNIT

(71) Applicant: VOLKSWAGEN AG, Wolfsburg (DE)

(72) Inventors: Holger Wild, Berlin (DE); Mark Peter Czelnik, Wolfsburg (DE)

(73) Assignee: Volkswagen AG (DE)

( * ) Notice: Subject to any disclaimer, the term of this patent is extended or adjusted under 35 U.S.C. 154(b) by 480 days.

(21) Appl. No.: 14/681,693

(22) Filed: Apr. 8, 2015

(65) Prior Publication Data

US 2015/0286393 A1 Oct. 8, 2015

(30) Foreign Application Priority Data

Apr. 8, 2014 (EP) .................................. 14163885

(51) Int. Cl.
| | |
|---|---|
| *G06F 3/048* | (2013.01) |
| *G06F 3/0488* | (2013.01) |
| *B60K 37/06* | (2006.01) |
| *H04M 1/60* | (2006.01) |
| *H04M 1/725* | (2006.01) |
| *G06F 3/0485* | (2013.01) |

(Continued)

(52) U.S. Cl.
CPC .......... *G06F 3/04883* (2013.01); *B60K 37/06* (2013.01); *G06F 3/04886* (2013.01); *H04M 1/6083* (2013.01); *H04M 1/72583* (2013.01); *B60K 2350/1004* (2013.01); *B60K 2350/1016* (2013.01); *G06F 3/0482* (2013.01); *G06F 3/0485* (2013.01); *G06F 3/0486* (2013.01)

(58) Field of Classification Search
None
See application file for complete search history.

(56) References Cited

U.S. PATENT DOCUMENTS

| | | | |
|---|---|---|---|
| 2006/0010399 A1* | 1/2006 | Lau ....................... | G06F 3/0482 715/853 |
| 2009/0228158 A1* | 9/2009 | Medler .................. | B60K 35/00 701/1 |

(Continued)

FOREIGN PATENT DOCUMENTS

| | | |
|---|---|---|
| CN | 101426663 A | 5/2009 |
| CN | 101727275 A | 6/2010 |

(Continued)

OTHER PUBLICATIONS

Dong-Sung Ryu et al., A hierarchical photo visualization system emphasizing temporal and color-based coherences, Jan. 11, 2011, Springer Science & Business Media, Edition or vol. 61, pp. 523-550 (Year: 2011).*

(Continued)

*Primary Examiner* — Tam T Tran
(74) *Attorney, Agent, or Firm* — Barnes & Thornburg LLP

(57) ABSTRACT

A user interface and a method for adapting a view on a display unit of a user interface wherein the method includes calling up a configuration mode for allocating a range of functions to at least one tile displayed on the display unit, displaying first operating areas representing a respective range of functions, receiving a first user input for the first operating area and, in response thereto, displaying second operating areas thematically associated with the first operating area.

17 Claims, 10 Drawing Sheets

(51) Int. Cl.
*G06F 3/0486* (2013.01)
*G06F 3/0482* (2013.01)

(56) References Cited

U.S. PATENT DOCUMENTS

| | | | | |
|---|---|---|---|---|
| 2010/0238115 | A1* | 9/2010 | Komaarashi | G06F 3/016 345/168 |
| 2010/0295795 | A1* | 11/2010 | Wilairat | G06F 3/04883 345/173 |
| 2011/0047557 | A1* | 2/2011 | Koskimies | G06F 9/4843 719/315 |
| 2013/0254714 | A1* | 9/2013 | Shin | G06F 3/0482 715/810 |
| 2014/0089833 | A1* | 3/2014 | Hwang | G06F 3/04817 715/769 |
| 2014/0173530 | A1* | 6/2014 | Mesguich Havilio | G06F 3/0482 715/863 |

FOREIGN PATENT DOCUMENTS

| | | |
|---|---|---|
| CN | 102292693 A | 12/2011 |
| CN | 102866914 A | 1/2013 |
| CN | 103677627 A | 3/2014 |
| DE | 19847610 A1 | 4/2000 |
| DE | 10205641 A1 | 8/2003 |
| DE | 102005048230 A1 | 4/2007 |
| DE | 102007016057 A1 | 11/2007 |
| DE | 102006040707 A1 | 3/2008 |
| DE | 102009048823 A1 | 4/2011 |
| DE | 102011107011 A1 | 3/2012 |
| EP | 1080974 A2 | 3/2001 |
| FR | 2937916 A1 | 5/2010 |
| JP | 2007507797 A | 3/2007 |
| KR | 20110080985 A | 7/2011 |
| KR | 20120138618 A | 12/2012 |
| KR | 20140039575 A | 4/2014 |
| WO | 2010134718 A2 | 11/2010 |

OTHER PUBLICATIONS

Office Action for Chinese Patent Application No. 201510163270.9; dated Aug. 2, 2017.

* cited by examiner

USER INTERFACE AND METHOD FOR ADAPTING A VIEW ON A DISPLAY UNIT

PRIORITY CLAIM

This patent application claims priority to European Patent Application No. 14163885.8, filed 8 Apr. 2014, the disclosure of which is incorporated herein by reference in its entirety.

SUMMARY

Illustrative embodiments relate to a user interface and to a method for adapting a view on a display unit of a user interface. In particular, illustrative embodiments relate to personalization of a so-called "home screen" on the operating system of a mobile electronic device or on a user interface of a means of transport.

BRIEF DESCRIPTION OF THE DRAWINGS

Exemplary embodiments are described in detail below with reference to the accompanying drawings, in which.

Figure 1:
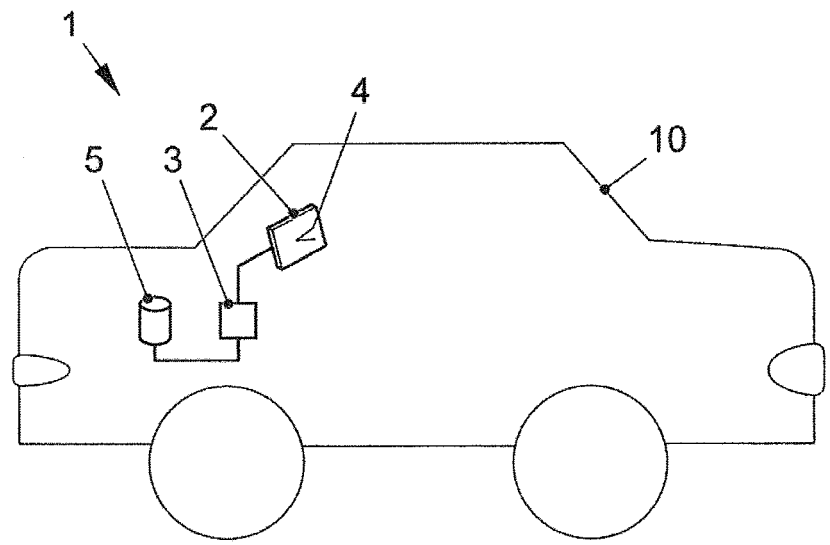
FIG. 1 is a schematic view of components of an exemplary embodiment of a user interface in an exemplary embodiment of a means of transport.

The English words contained in the figures represent graphical symbols in this application.

DETAILED DESCRIPTION OF THE DISCLOSED EMBODIMENTS

The disclosed method is used to adapt a view on a display unit of a user interface. The user interface may be arranged, for example, in a mobile electronic device or in a means of transport. Inputs and outputs can be made via the user interface and a multiplicity of functions of the electronic device or the means of transport can therefore be operated. The display unit may be a matrix display for displaying optional contents. A configuration mode for allocating an amount of information to a tile displayed on the display unit is first of all called up. The configuration mode is used to personalize the contents of the displayed tile. Within the scope of the disclosed embodiments, a "tile" is understood as meaning a display element which indicates a spatially limited display area in which information for a predetermined range of functions is displayed. In particular, a "tile" is first of all provided only for the purpose of displaying information without individual functions in the range of functions being able to be started from the tile itself. Optionally, an operating interaction with the tile may result in corresponding functions being able to be displayed in another view and then being able to be operated. The tile may be part of a home screen which optically reproduces a multiplicity of different ranges of functions in the form of tiles. To allocate a new range of functions to a tile displayed on the display unit, a multiplicity of first operating areas each representing another range of functions are displayed. In other words, the multiplicity of first operating areas are a choice of available ranges of functions. The first operating areas may be main categories of different functions of a vehicle, for example. As a result of a first user input for the first operating area being received, a second multiplicity of second operating areas which are thematically associated with the first operating area and can be understood as meaning a subcategory of the function of the first operating area, for example, are displayed. The first multiplicity of first operating areas may be a movable band of adjacent operating areas which is extended with the second multiplicity of the second operating areas in response to the first user input. In the case of a band, two adjacent operating areas of the first multiplicity of operating areas may be pushed apart, with the result that there is space for displaying the second operating areas between the two first operating areas. This also makes it possible to group large ranges of functions or many functions in a clear and conveniently selectable manner and, in a hierarchically structured manner, to select them for the purpose of configuring a tile. This reduces the period spent by the user when configuring the user interface. This makes it possible to more quickly dim the display unit after the successful configuration has been concluded, with the result that the energy reserves of the rechargeable battery are used less in the case of a mobile user terminal. Using the example of a means of transport, the advantage of shorter distraction of the user from the road traffic results, thus increasing the road safety of a means of transport equipped according to the disclosed embodiments.

A second user input for a first operating area or a second operating area may be received and, in response thereto, a range of functions respectively associated with the operating areas is allocated to the tile to be configured. Depending on whether the tile has been previously associated with the multiplicity of displayed operating areas ("has received the focus") or such an allocation has not yet been carried out, the second user input may comprise a tapping gesture or a "drag and drop" gesture. In other words, the second user input results in a confirmation of a displayed operating area for allocating a range of functions associated with it to a tile. This makes it possible to allocate the range of functions in an even more intuitive manner.

To provide the user with an indication of what effect his selection or allocation will have during interaction with the first or second operating area, that position to which the range of functions would be allocated by means of a confirmation can be marked on the display unit. This may be carried out in response to a tapping gesture in a first or second operating area. Alternatively or additionally, the position may comprise one or more tiles which is/are intended to be associated with the range of functions by means of a drag and drop gesture. A partially transparent color field may be superimposed on the position, for example, or the position can be accordingly tinted. Alternatively or additionally, the position may be edged by a frame and optically highlighted thereby. Alternatively or additionally, other color settings of the position can also be adapted in such a manner that they differ from regions of the display unit which are outside the position (for example other tiles).

This illustrates to the user, even before the allocation has been concluded or confirmed, what effect his current operating step could have. From this time on, a confirmation can be given without the user having to focus on the display unit in this case. In this manner, the user can turn to other tasks and can confirm the allocation "blindly" as it were.

The first user input for displaying the second multiplicity of second operating areas and/or the second user input for allocating the range of functions to the tile(s) may comprise a tapping gesture and/or a drag and drop gesture and/or a two-finger zoom gesture. The latter gesture is also referred to in English as a "pinch" or "spread" gesture (depending on the relative movement of the fingers), in which two fingers in contact with an input unit (for example the surface of a touch-sensitive display element) are moved toward one another or away from one another. For example, the second multiplicity of second operating areas may be revealed between the first operating area and an adjacent first operating area by means of a spread gesture. In this manner, shifting of the first operating areas ("scrolling" by means of a finger) can be clearly distinguished from the user's wish to display the second multiplicity of operating areas. Conversely, the second multiplicity of operating areas may accordingly be "retracted" or "collapsed" in response to a pinch gesture, after which only first operating areas are displayed. The use of such a two-finger gesture avoids the need of having to exactly hit a button which is possibly arranged in the first operating area and is intended to extend the second multiplicity of second operating areas. This may be advantageous, in particular, during mobile use of the user interface.

The first multiplicity of first operating areas may be displayed in response to a predefined fourth user input which may relate to the first tile, for example. For example, a tapping gesture carried out on the first tile may reveal the first multiplicity of first operating areas, in which case the first tile is automatically associated with the first multiplicity of first operating areas and acts as a predefined (target) position with input focus at least with respect to individual gestures (for example tapping gesture in a first operating area). A long-press gesture on a first tile is also possible as a fourth user input to display the first multiplicity of first operating areas. Irrespective of a predetermined tile, a swipe gesture can also be used to display the first multiplicity of first operating areas. Such a swipe gesture may be predefined in the configuration mode, for example, in such a manner that a swipe gesture aimed in the direction of the center of the display is carried out from an edge of the display unit. This also makes it possible to determine the position of the first multiplicity of first operating areas by virtue of the first multiplicity of first operating areas respectively being inserted along the edge from which the swipe gesture was started. A suitable position for the first multiplicity of first operating areas can therefore be selected depending on the tile or position to which the range of functions is intended to be allocated. This increases the operating ergonomics when allocating a range of functions to a tile.

The tile may be part of a so-called "home screen". A "home screen" is understood as meaning a screen view which is freely configurable, in particular, and in which the user gains an overview of the ranges of functions and operating parameters which are most important (to him). A user interface may have, for example, a plurality of home screens between which the user can choose for the purpose of displaying different information overviews, depending on requirements. The ranges of functions of the first multiplicity of operating areas may come from the areas of "music playback", "routing", "air-conditioning control" and/or the representation of information for trip statistics (also called "on-board computer"). Second operating areas from the areas of "current title", "current artist", "current album", "available sources", "purchase of additional titles", etc. may be associated, as subcategories, with the area of music playback. Second operating areas representing ranges of functions from the areas of "current position", "points of interest", "destination input", "traffic reports", etc. may be associated with the area of "routing". Second operating areas for ranges of functions from the areas of "heat sources", "fan levels", "seat heating", "steering wheel heating", "airflow distribution", etc. may be associated with the range of functions of "air-conditioning control". Second operating areas for ranges of functions from the areas of "remaining range", "kilometers traveled", "expected arrival time", "average speed", "average consumption", etc. may be associated with the area of the "on-board computer". The variety of possible second operating areas for four first operating areas alone shows the order potential of the disclosed embodiments.

A second disclosed embodiment provides a user interface having a display unit, a processing unit and an input unit. The display unit may be a matrix-type screen element for displaying optional contents. The processing unit may comprise a programmable processor (for example microcontroller or nano controller) and/or a graphics card. The input units are set up to receive user inputs and may comprise a substantially transparent surface on the display unit in the form of a touchscreen. The abovementioned features set up the user interface to carry out a method. The features, combinations of features and advantages resulting therefrom clearly correspond to those stated in connection with the first-disclosed embodiment such that reference is made to the above statements to avoid repetitions.

The user interface may be set up to be permanently integrated in a means of transport. For this purpose, the display unit may be a component set into a dashboard of the means of transport, for example. The processing unit may constitute a control device which optionally carries out ranges of functions from other areas of the means of transport. In this manner, the resources available in hardware can be used together and can therefore be used up in an improved/more uniform manner. For example, the user interface may also receive sensor signals from sensors of the means of transport and, in response thereto, may cause or change a display of information on a tile of a home screen. The use of the method or the use of a user interface in a means of transport has the advantage, in particular, that the vehicle guidance becomes safer during the journey as a result of more ergonomic operation of the user interface.

A third disclosed embodiment provides a computer program product (for example a data memory) which stores instructions which enable a programmable processor to carry out the steps of a method according to the first-disclosed embodiment. The computer program product may be a CD, a DVD, a Blu-ray disc, a flash memory, a hard disk, a RAM/ROM, a cache, etc.

A fourth disclosed embodiment provides a signal sequence representing instructions which enable a programmable processor to carry out the steps of a method according to the first-disclosed embodiment. In this manner, the IT provision of the instructions is also protected for that case in which the storage means required for this purpose are outside the scope of application of the accompanying claims.

A fifth disclosed embodiment provides a user terminal which may be in the form, in particular, of a data processing device, optionally a mobile wireless communication device. The user terminal comprises a user interface, as has been described in detail in connection with the second-disclosed embodiment. Reference is also made to the above statements with respect to the features and advantages of the user terminal.

A sixth disclosed embodiment provides a means of transport which may be a vehicle, in particular. The means of transport may be an automobile, a transporter, a truck, a watercraft and/or an aircraft. The disclosed embodiment provides a user interface for operating the means of transport, as has been described in detail in connection with the second-disclosed embodiment.

FIG. 1 shows an exemplary embodiment of a user interface 1 which is arranged in an automobile 10 as a means of transport. A screen 2 is set into the dashboard of the automobile 10 as a display unit and is connected to an electronic control device 3 by means of information technology. The surface of the screen 2 is provided with a touch-sensitive transparent surface 4 as an input unit, the control signals from which are likewise passed to the electronic control device 3. To display optional contents and to classify gestures carried out on the surface 4 by the user, the electronic control device 3 is connected to a data memory 5 by means of information technology.

Figure 2:
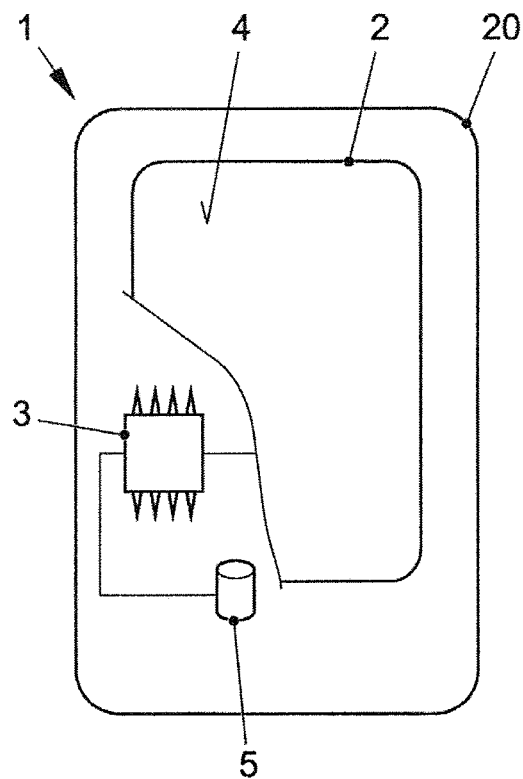
FIG. 2 is a schematic view of components of an exemplary embodiment of a user interface in an exemplary embodiment of a user terminal.

FIG. 2 shows the components of an exemplary embodiment of a user interface 1 inside a tablet PC 20 as the user terminal. A screen 2 is provided with a touch-sensitive transparent surface 4. Both are connected, by means of communication technology, to a programmable processor 3 as the processing unit. The programmable processor 3 is also connected, by means of information technology, to a data memory 5 from which the processor can obtain information for classifying user gestures etc.

Figure 3:
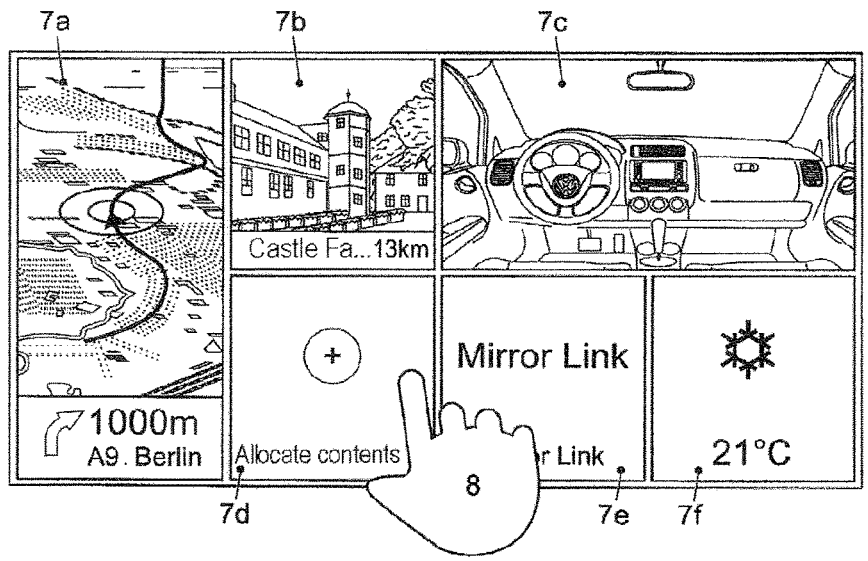
FIGS. 3 to 14 are operating steps when operating a configuration mode of an exemplary embodiment of a user interface.

FIG. 3 shows a home screen as screen contents as could be displayed on a display unit of a user interface. Six tiles 7a, 7b, 7c, 7d, 7e, 7f are displayed beside one another and above one another on the screen. They are used to represent information relating to the routing and the vehicle interior lighting, to represent information relating to a data connection outside the vehicle and to display a current air-conditioning setting. A tile 7d currently does not have its own range of functions, which is why the hand 8 of a user is touching this tile by means of a tapping gesture to allocate contents to the tile.

Figure 4:
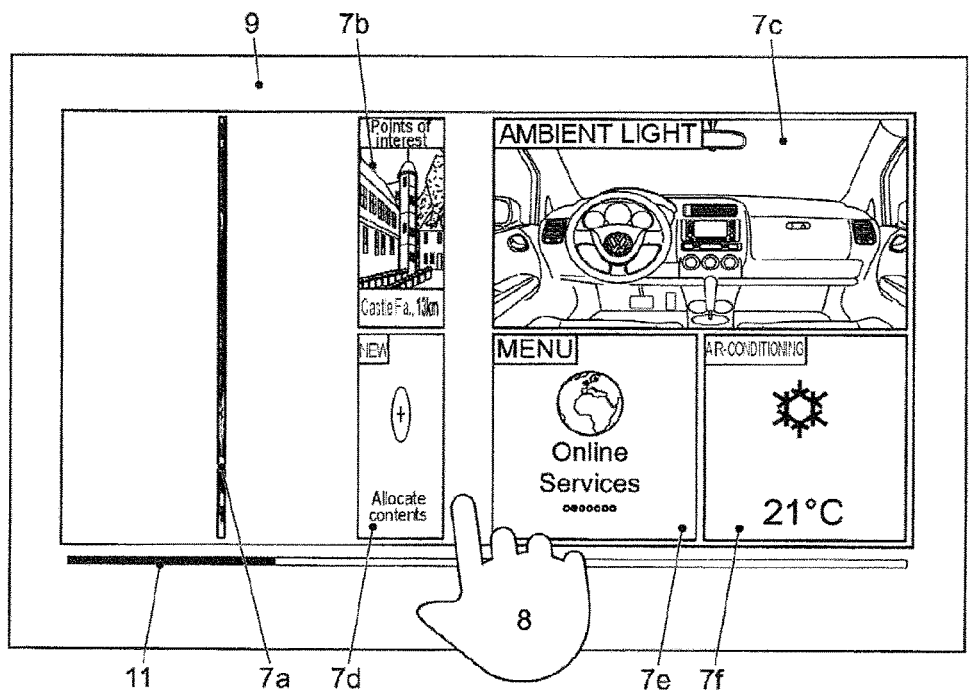

FIG. 4 shows a screen view 9 of a configuration mode following the operating step illustrated in FIG. 3, in which the tiles 7a-7f are turned in a temporally offset sequence from left to right by means of rotation about their central vertical axis. In this case, the tiles 7a-7f are displayed in a somewhat reduced size, in which case a frame 9 fills the space which has become free at the edge of the screen. This frame 9 illustrates the configuration mode.

Figure 5:
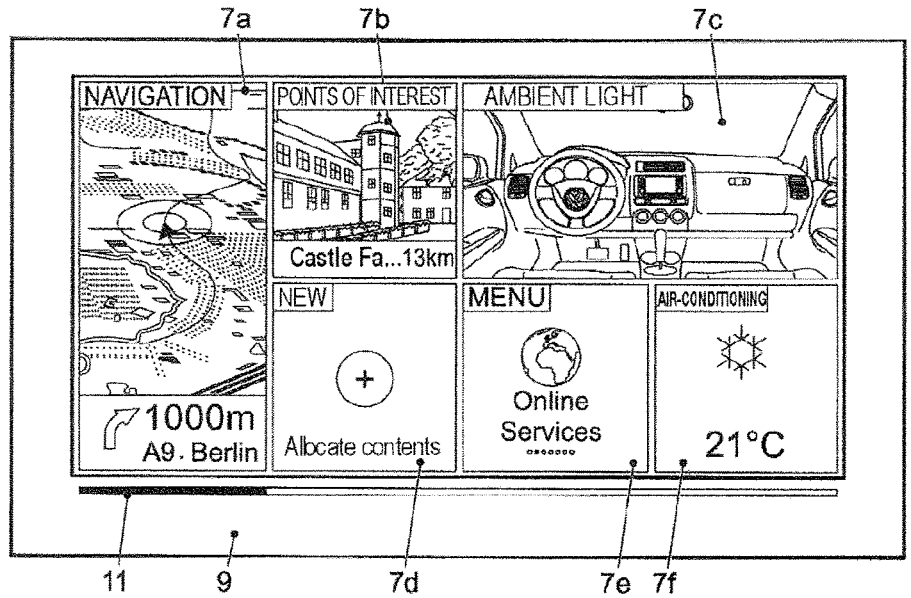

FIG. 5 shows the result of the process of calling up the configuration mode, as discussed in connection with FIGS. 3 and 4. The frame 9 has reached its final thickness, the tiles 7a-7f have been completely turned and shrunk to their target size. A so-called scrollbar 11 has appeared below the tiles 7a-7f, whereas an optically highlighted area indicates that the illustrated home screen is arranged at the left end of a sequence of home screens.

Figure 6:
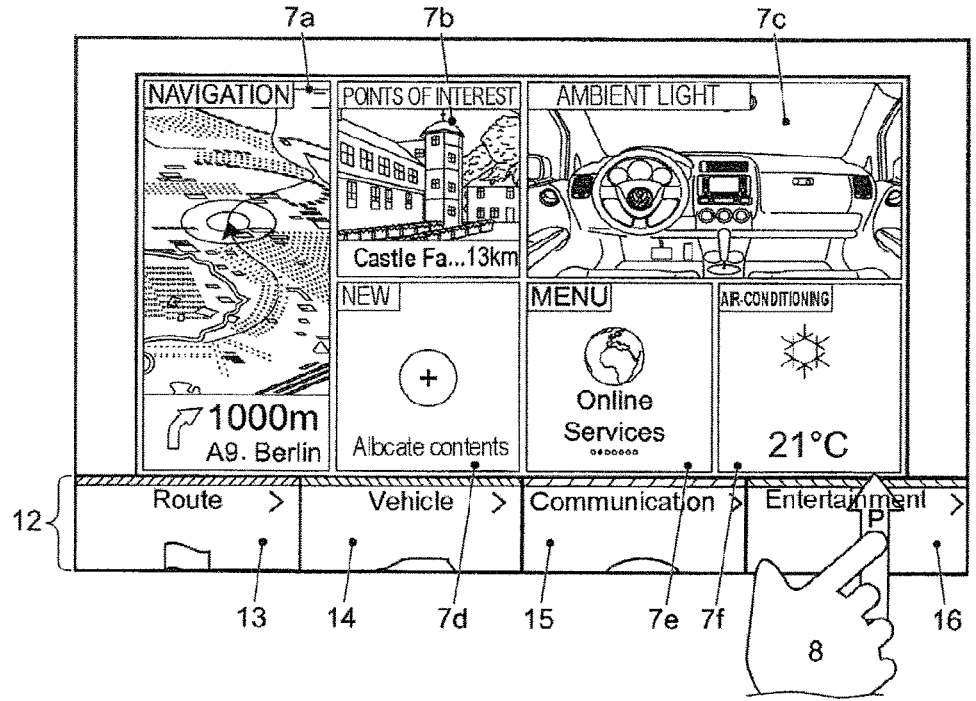

FIG. 6 shows a swipe gesture P of a user's hand 8 as a fourth user input which is aimed from a lower edge of the screen in the direction of a horizontal center line of the screen. In response thereto, a first multiplicity 12 of first operating areas 13, 14, 15, 16 which are inserted following the gesture P are visible.

Figure 7:
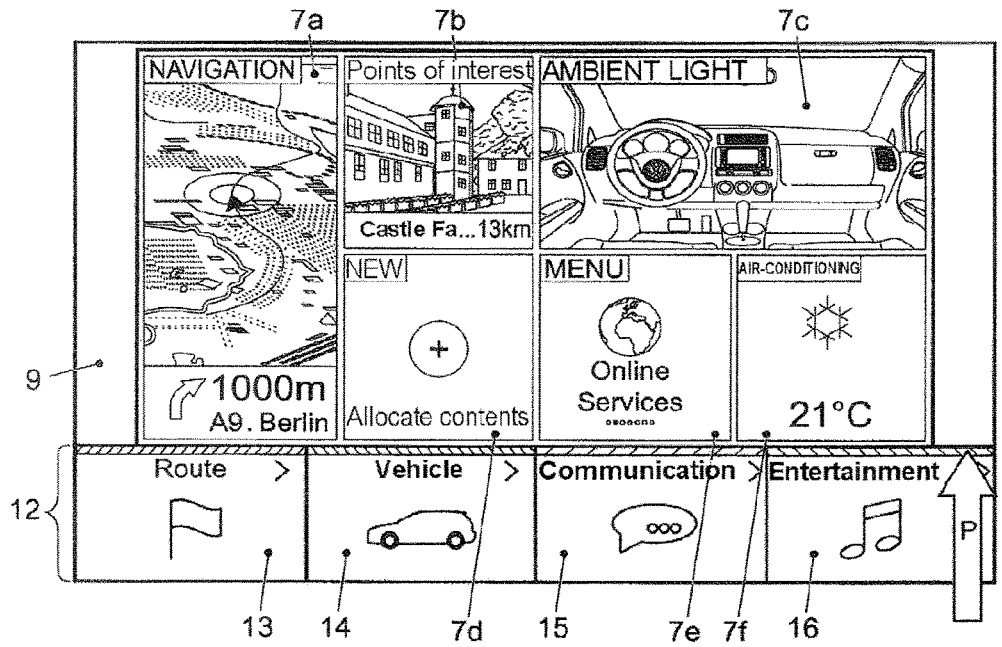

FIG. 7 shows the result of the process of calling up the multiplicity 12 of operating areas 13 to 16 which was started in FIG. 6. The edge 9 previously above the tiles 7a-7f has been shrunk to make space for the multiplicity 12 of operating areas 13-16. The multiplicity 12 of operating areas 13-16 have also been completely superimposed on the edge 9 below the tiles 7a-7f. This makes it possible to substantially retain the reduced size of the tiles 7a-7f even though the multiplicity 12 of operating areas 13-16 are now additionally visible.

Figure 8:
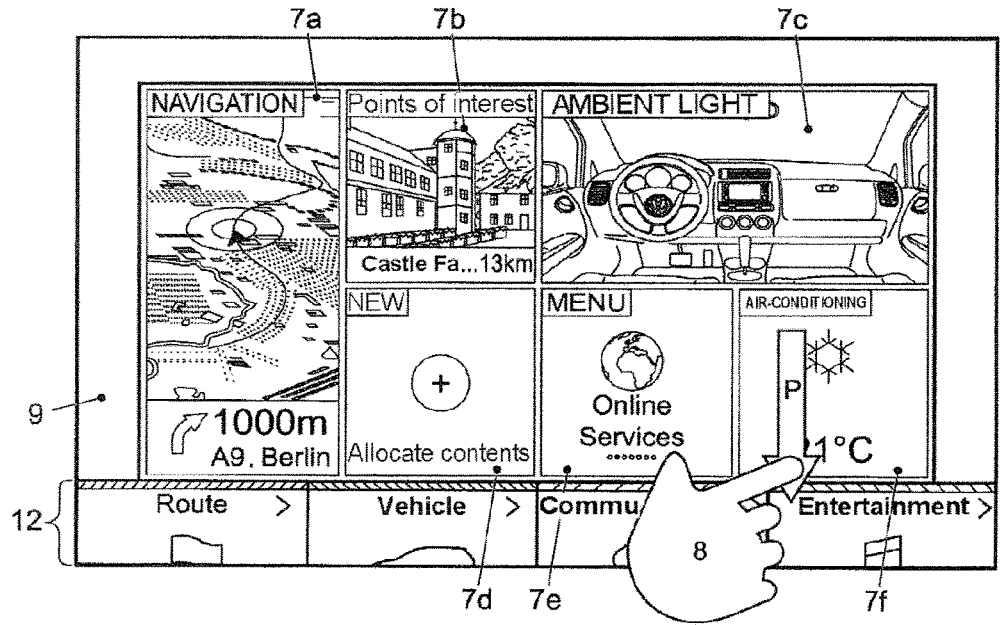

FIG. 8 shows a swipe gesture P which is aimed vertically downward and is used to push the multiplicity 12 of operating areas 13-16 from the visible area. In this case, the upper edge of the multiplicity 12 follows the swipe gesture P until a reduced display of the operating areas 13-16 without graphics symbols has been achieved. The edge 9 originally above the tiles 7a-7f is incompletely restored.

Figure 9:
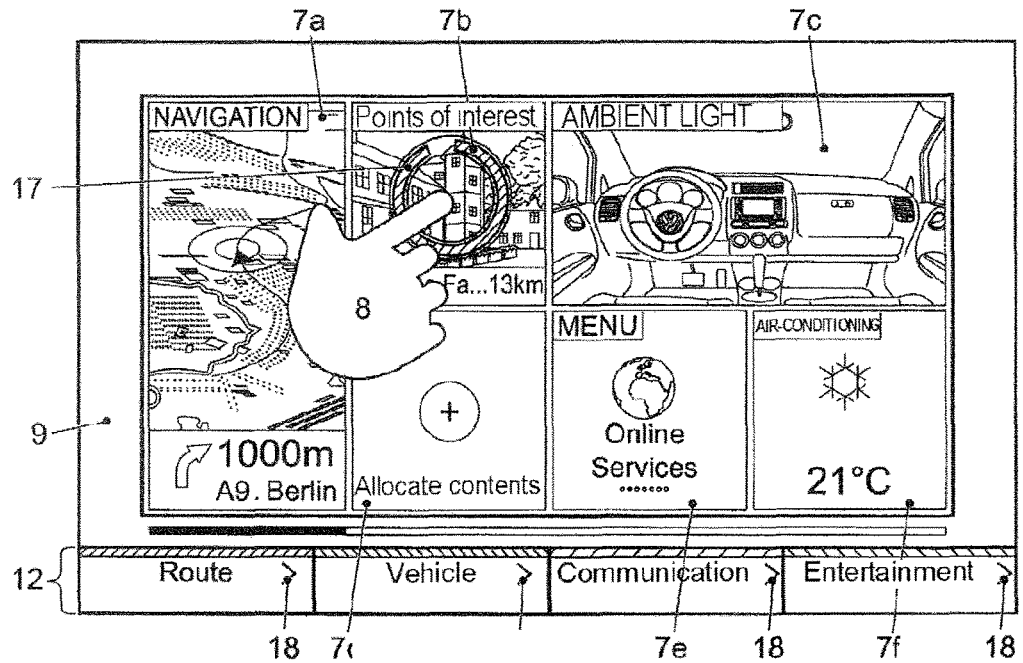

FIG. 9 shows a long-press gesture of the hand 8 on the tile 7b, whereas the multiplicity 12 of operating areas 13-16 appear in a reduced display. An indication 17 illustrates the time course of the long-press gesture. In this case, an illuminated edge region of a ring symbol is extended in the clockwise direction until a closed illuminated edge region indicates the expiry of a period predefined for the long-press gesture. The operating areas 13-16 are distinguished only by their title and a header which is personalized in terms of color. The previously included graphics symbols have been hidden. In addition to the titles, a respective drag point 18 is displayed as a button which signals the option of calling up subcategories as second operating areas.

Figure 10:
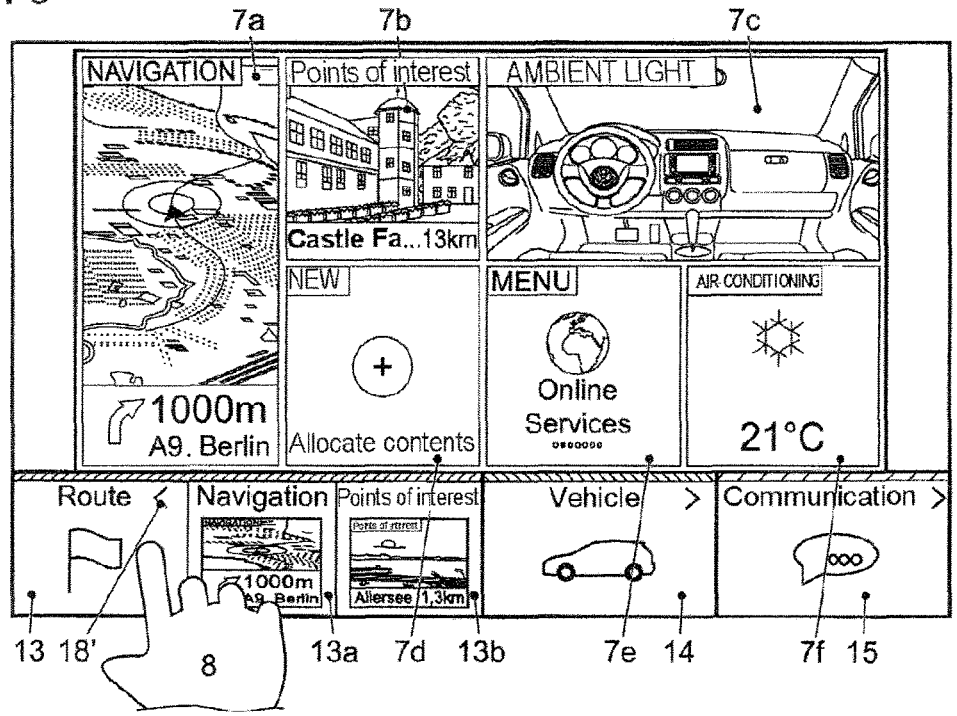

In FIG. 10, a tapping gesture of the hand 8 in the operating area 13 results in second operating areas 13a, 13b associated with the operating area 13 being called up. The second operating areas constitute subcategories of the category "route" and relate to the routing and points of interest. In response to the appearance of the second operating areas 13a, 13b, the drag point 18' is oriented in the opposite direction in comparison with the drag points 18. This indicates to the user that a further interaction with the drag point 18' results in the second operating areas 13a, 13b being hidden.

Figure 11:
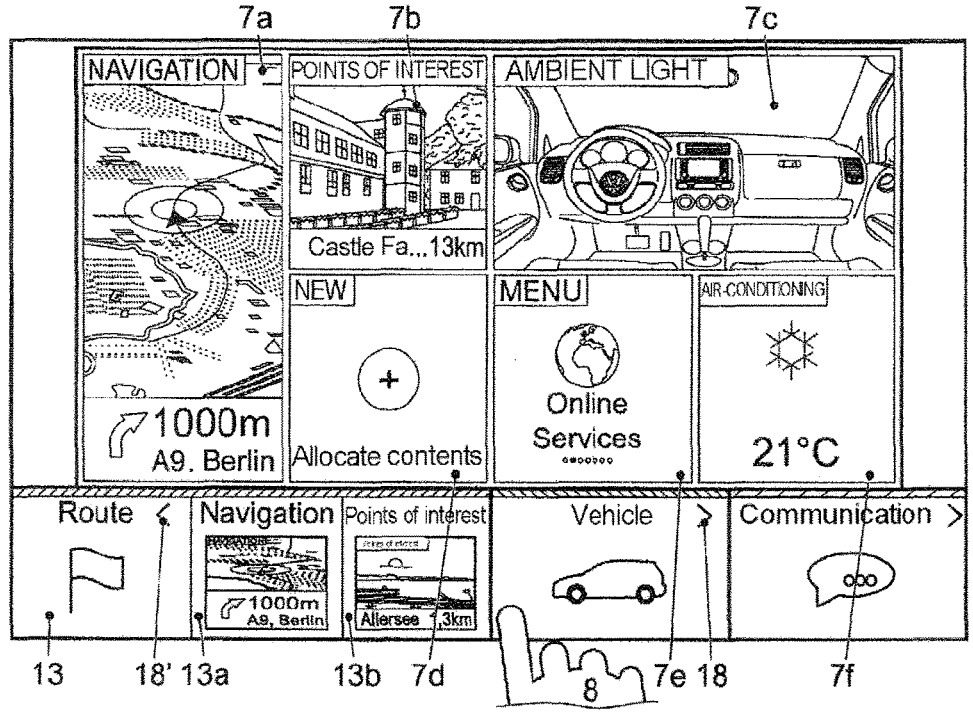

FIG. 11 shows a user interaction with the operating area 14, in response to which additional, second operating areas are displayed.

Figure 12:
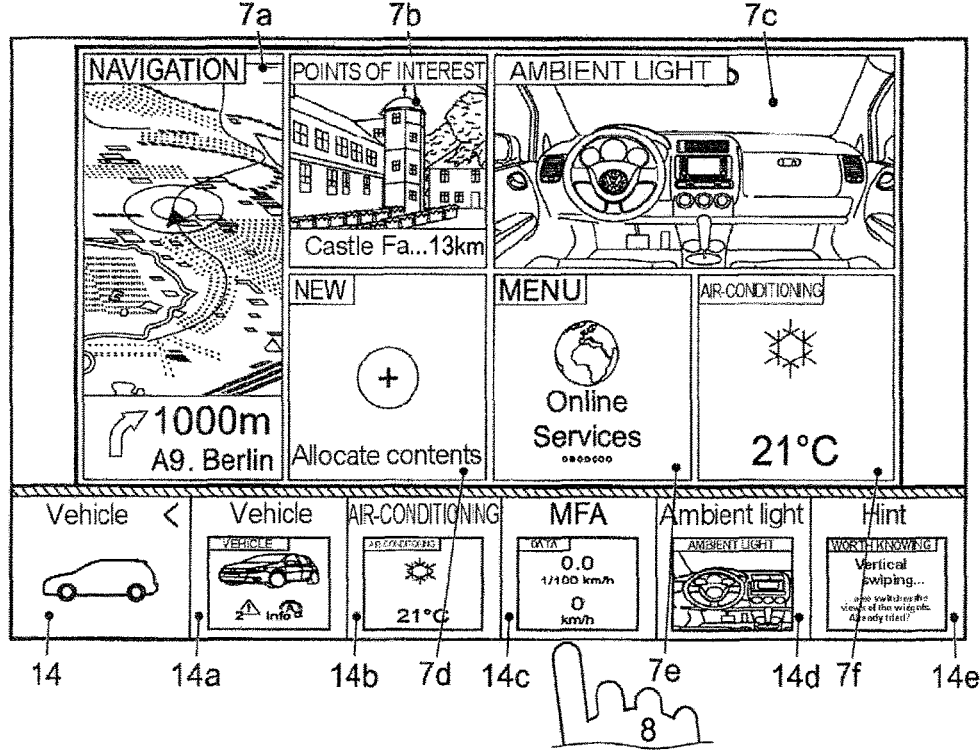

FIG. 12 shows the result of the user interaction which is illustrated in FIG. 11 and can likewise be understood as meaning a first user input in the sense of the disclosed embodiments. In addition to the first operating area 14 relating to vehicle functions, second operating areas 14a-14e have appeared and are lined up between the first operating areas 14 and 15. They relate to an overview of operating states of the vehicle, air-conditioning settings, average values for operating parameters, the interior lighting and a suggestion for the performance of suitable user interactions.

Figure 13:
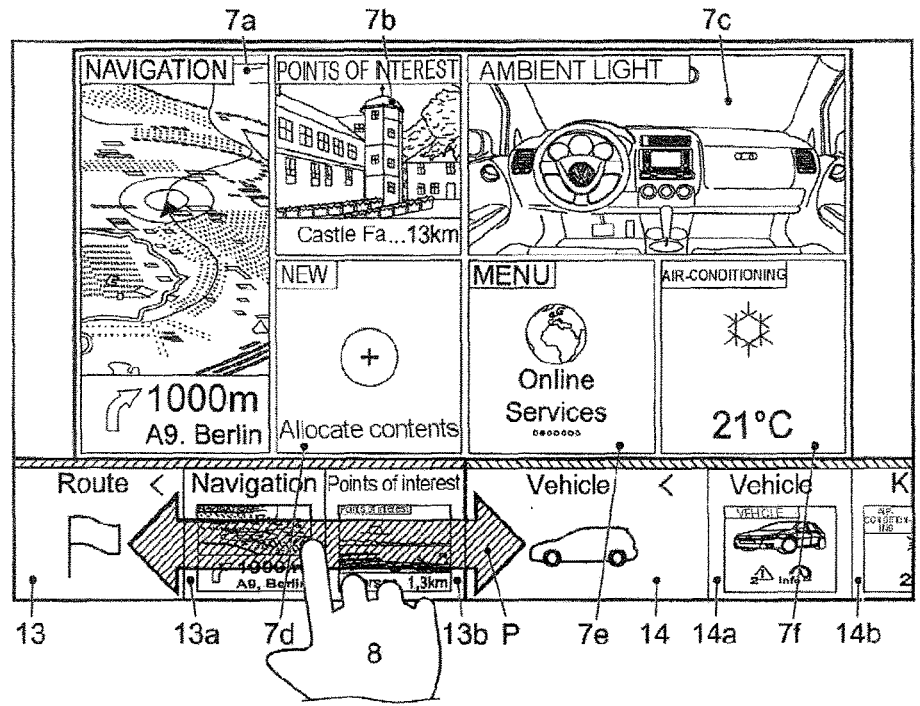

FIG. 13 uses a horizontal double-headed arrow P to show how first operating areas 13-16 or second operating areas 13a, 13b, 14a-14e which are not currently arranged in the visible area can be moved into the visible area. The horizontal swipe gesture along the double-headed arrow P may be a one-finger gesture for shifting all operating areas or the entire range of functions which is also referred to as a "topic band". To provide an alternative gesture for hiding the second operating areas 13a, 13b, it is possible to use a two-finger gesture (not illustrated) in which a first finger can be arranged on the first operating area 13a and a second finger can be arranged on the second operating area 13b. If the fingers are brought together according to a zoom-out gesture, the second operating areas 13a and 13b disappear.

Figure 14:
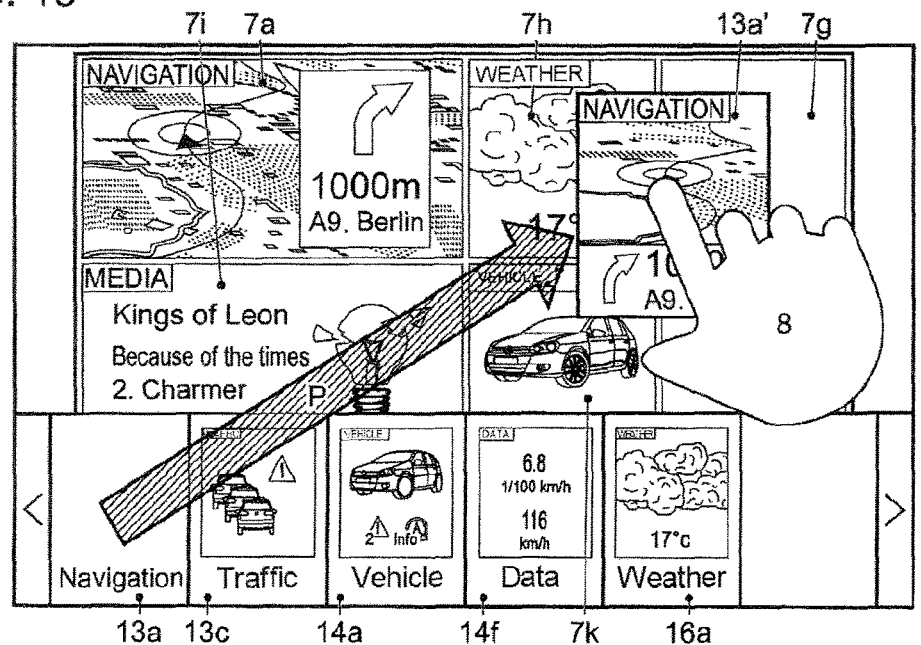

FIG. 14 shows an alternative division of the area of a home screen, in which, in addition to the tile 7a, alternative tiles 7g, 7h, 7i, 7k are displayed in the configuration mode. By means of a drag or swipe gesture, the user's hand 8 moves a second operating area 13a relating to navigation information along an arrow P into the area of a tile 7g. As soon as the second operating area 13a virtually adhering to the user's hand 8 has arrived at a position above the tile 7g, the tile 7g is given the color blue corresponding to the category "route" to signal to the user that only the tile 7g receives the range of functions of the second operating area 13a if the hand 8 is immediately lifted from the screen. The lifting of the hand 8 can therefore be understood as meaning "dropping" for the purpose of confirming the desired allocation.

Figure 15:
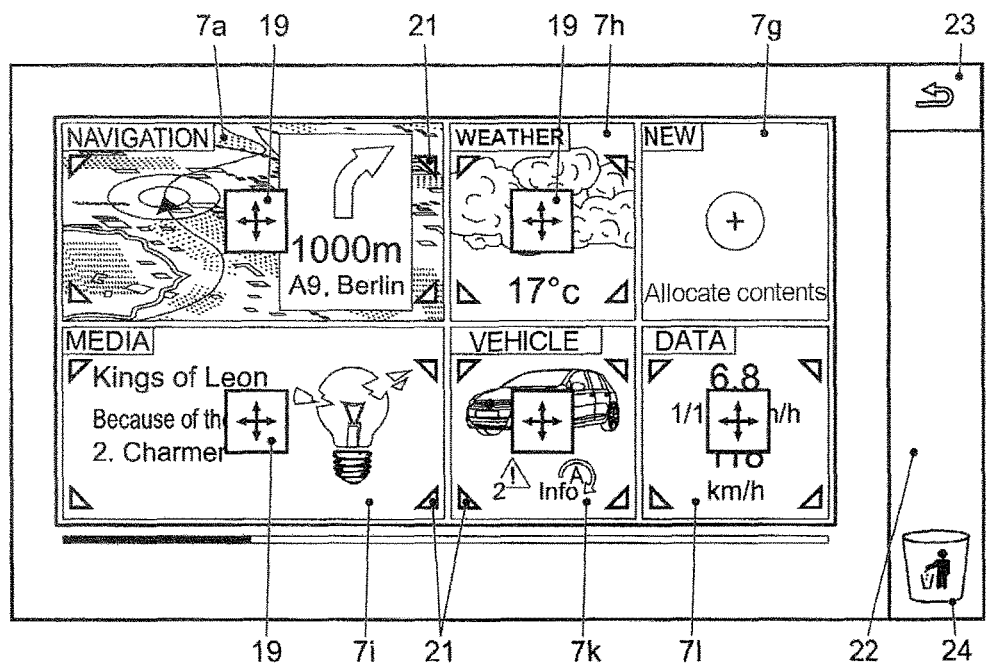
FIG. 15 is an alternative screen display in a configuration mode of an exemplary embodiment of a user interface.

FIG. 15 shows an alternative view of a configuration mode of a user interface, in which the currently provided tiles 7a, 7g, 7h, 7i, 7k and 7l are displayed to the user as being able to be moved or shifted by means of indicators in the form of arrowheads 19, 21. A button 23 for canceling the operating step carried out last is provided at the top right-hand screen edge 22. A recycle bin 24 for removing a range of functions from a tile 7a, 7g, 7h, 7i, 7k, 7l is provided at the bottom. Alternatively, a marked tile can be completely deleted by actuating the recycle bin 24, in response to which a previously adjacent tile additionally occupies its screen area.

Figure 16:
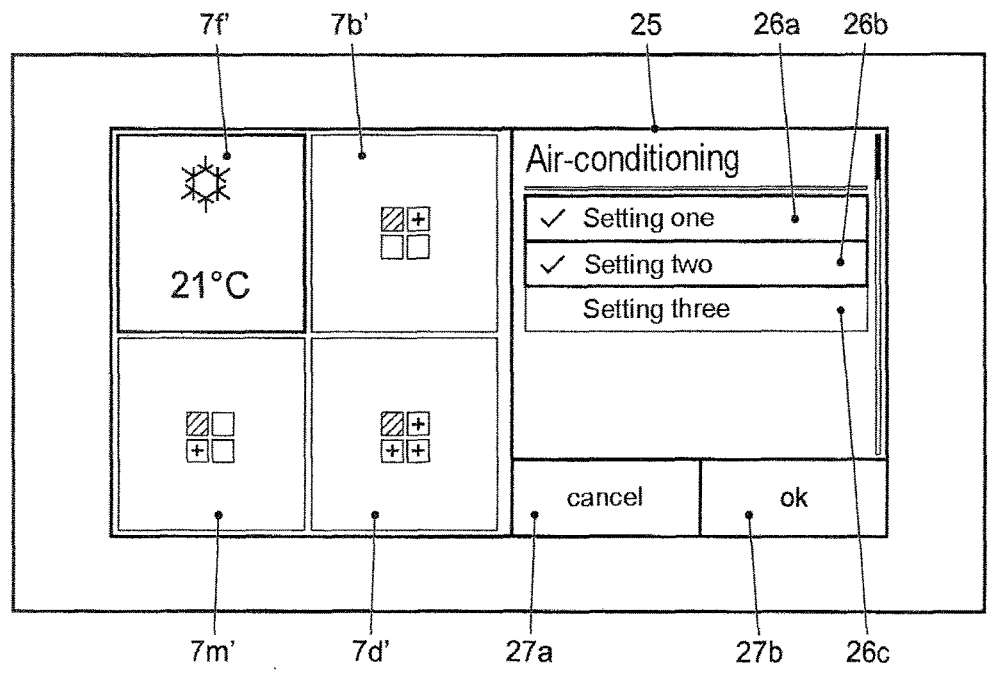
FIG. 16 is an alternative screen display in a configuration mode of an exemplary embodiment of a user interface.

FIG. 16 shows a screen view in a configuration mode of an exemplary embodiment of a user interface, in which detailed settings for the ranges of functions or contents of a considered tile can be selected and adapted. In the example, the tile 7f is selected, whereas the tiles 7b', 7d', 7m' do not have an input focus and do not have any contents. Symbols on the tiles 7b', 7d', 7m' indicate that, as a result of a tapping gesture on the respective tile, the selected tile 7f can additionally use its area by means of merging. According to the plus symbols on the tiles 7b', 7d', 7m', either a screen area beside the tile 7f in the horizontal direction and/or a screen area below the tile 7f in the vertical direction can be displayed in addition to the display of the air-conditioning setting (current range of functions of the tile 7f). A set-up menu 25 is displayed in the right-hand half of the screen, in which menu only schematically three different settings 26a, 26b, 26c can be selected for the tile 7f. In the example, the two upper settings 26a, 26b are selected, but not the setting 26c. It is possible to leave the set-up menu 25 using a first button 27a without accepting the changes or using a button 27b with acceptance of the changes.

Figure 17:
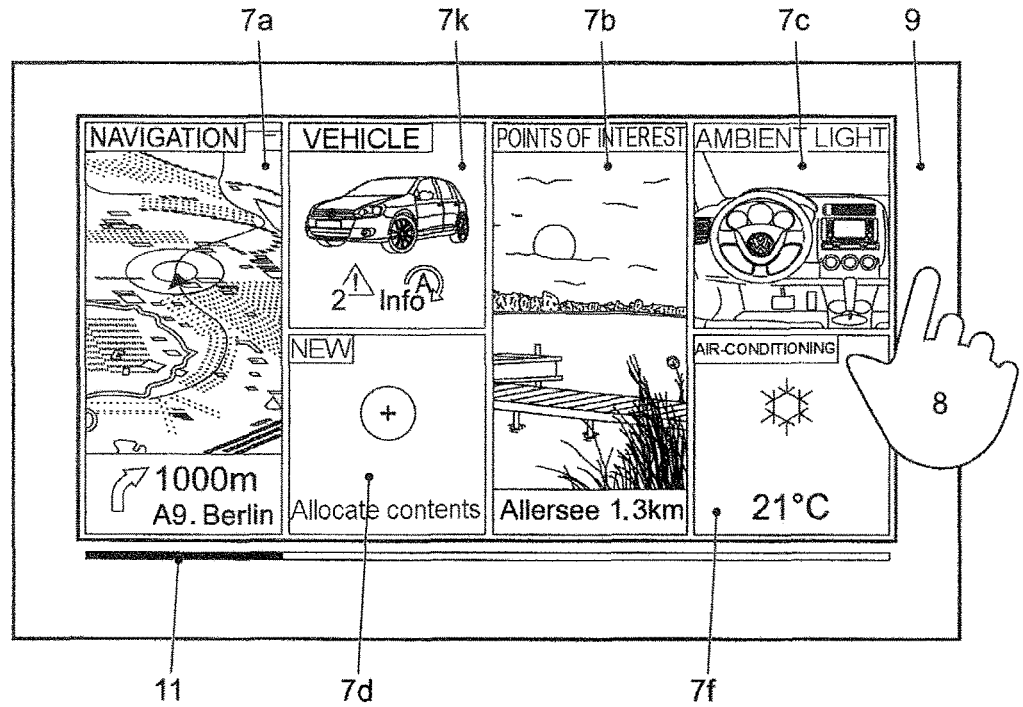
FIG. 17 is an exemplary embodiment of an operating step for ending the configuration mode of an exemplary embodiment of a user interface.

FIG. 17 shows a tapping gesture of a user's hand 8 on the frame 9 of a home screen in the configuration mode, in response to which the configuration mode is left. This can be effected, for example, by means of an animation illustrated in FIG. 4 (in particular in the opposite direction).

Figure 18:
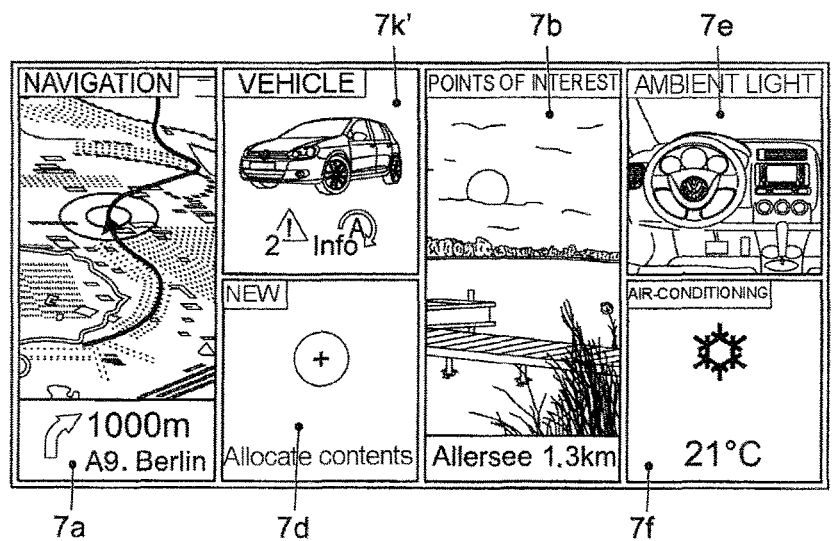
FIG. 18 is a screen view after leaving a configuration mode of an exemplary embodiment of a user interface.

FIG. 18 shows the result of the process of leaving the configuration mode which was initiated in FIG. 17. The tiles 7a, 7b, 7c, 7d, 7f illustrated in FIG. 9, for example, and a newly added tile 7k' are displayed. The edge 9 has tapered to the original width or has disappeared. The contrast of the pictograms displayed on the tiles has likewise been increased, as a result of which it is illustrated to the user that the configuration mode has been successfully left.

Figure 19:
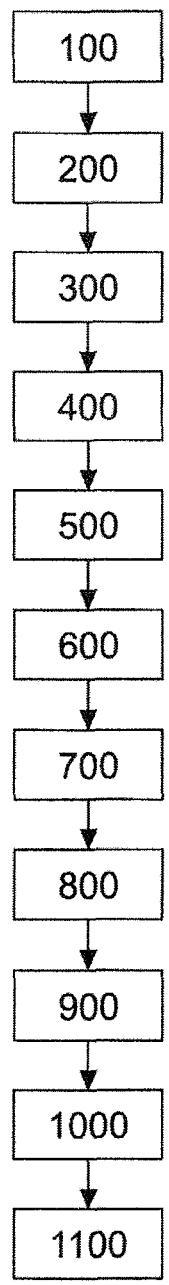
FIG. 19 is a flowchart illustrating steps of an exemplary embodiment of a method.

FIG. 19 shows a flowchart illustrating steps of an exemplary embodiment of a method. In step 100, a configuration mode for allocating a range of functions to one tile of a multiplicity of displayed tiles, which is displayed on the display unit, is called up. The configuration mode is used to adapt a home screen, for example, to the individual requirements of a user. In step 200, an input unit of the user interface receives a fourth user input, in response to which the first multiplicity of first operating areas are displayed in step 300. The operating areas are used to graphically allocate a range of functions to the tile of interest. In step 400, a first user input for the first operating area is therefore effected, which is detected by the input unit of the user interface. The first operating area represents a main category of vehicle functions, with the result that, in response to the first user input, associated subcategories in the form of a second multiplicity of second operating areas thematically associated with the first operating area are displayed in step 500. In step 600, the user selects a range of functions using a second user input for a (first or second) operating area. For this purpose, a signal from the input unit is received by the user interface to classify the second user input and associate it with the allocation command. In response to the reception of the allocation command, the range of functions associated with the first operating area or the second operating area is allocated to the tile in step 700. This is carried out, for example, by means of a swipe gesture, during which the user drags the relevant operating area over the tile of interest. To give the user an impression of the position at which the selected range of functions is displayed when the allocation command is confirmed, that position to which the range of functions would be allocated by a confirmation is marked on the display unit in step 800. This can be carried out, for example, by coloring the relevant tile(s) or by adapting color settings of the relevant position. In step 900, a third user input for the first operating area is effected since the user no longer requires the second operating areas which have been revealed. In response thereto, the second multiplicity of second operating areas are hidden in step 1000. This can be carried out, for example, by means of a tapping gesture on a drag point in an operating area which is associated with the second operating areas. Alternatively or additionally, a so-called pinch gesture can be carried out, which gesture moves the first operating area and at least one second operating area associated with it toward one another. The configuration mode is then left in step 1100 by virtue of the user tapping on an edge arranged outside the tiles, which edge then disappears and makes space for an enlarged display of the tiles.

Even though the disclosed embodiments have been described in detail using the exemplary embodiments explained in conjunction with the accompanying figures of the drawing, modifications and combinations of features of the illustrated exemplary embodiments are possible for a person skilled in the art without departing from the scope of the present invention, the scope of protection of which is defined by the accompanying claims.

Graphical user interfaces have become prevalent for operating a wide variety of operating systems. To make it possible to personalize displayed information in line with the needs of the respective user, it is conventional for the user to adapt so-called home screens which display tiles for respective ranges of functions. In this case, the user allocates a desired amount of information to a respective tile by selecting an entry from a list, for example, the corresponding range of functions of which entry is then associated with the tile.

WO 2010/134718 A2 shows a method for adapting home screens of a mobile user terminal. In this case, a tile is associated with a home screen and is moved from a first home screen to a second home screen by means of different gestures.

DE 10 2005 048 230 A1 shows an input apparatus for a user interface of a motor vehicle, in which practically different feedback is output on the basis of a duration of an input gesture.

DE 10 2009 048 823 A1 discloses a method for providing feedback on an interval of time which has elapsed since the beginning of an input, in which a marking gradually running around the edge of a symbol is a measure of the increasing course of time.

Disclosed embodiments make adaptation of a view on a display unit of a user interface more convenient and carry out the adaptation in a clearer manner.

LIST OF REFERENCE SYMBOLS

1 User interface
2 Screen
3 Processing unit
4 Touch-sensitive transparent surface
5 Data memory
7 Tiles
8 Hand
9 Edge
10 Automobile
11 Scrollbar
12 Multiplicity of first operating areas
13-16 First operating areas
17 Long-press indicator
18 Drag point
19 Shift indicator
20 Tablet PC
21 Shift indicator
22 Edge region
23 Button
24 Recycle bin
25 Set-up menu
26a-26c Settings
27a, b Buttons
100-1100 Method steps
P Swipe gesture

The invention claimed is:

1. A method for enabling a user to customize a home screen displayed on a graphical user interface in a vehicle, the method comprising:
in response to user input on the graphical user interface, entering a configuration mode for receiving user input selecting a displayed tile to allocate with a range of vehicle functions, wherein the selected, displayed tile is one tile of a plurality of displayed tiles displayed on the graphical user interface;
while in the configuration mode, displaying a plurality of first operating areas, each of the first operating areas representing a respective range of vehicle functions;
while in the configuration mode, receiving a first user input in relationship to the plurality of first operating areas selecting one of the plurality of first operating areas and, in response thereto,
while in the configuration mode, displaying a plurality of second operating areas each being thematically associated with the selected first operating area and the associated range of vehicle functions, and
while in the configuration mode, the selection of the one of the plurality of first operating areas triggers input focus wherein current setting for the ranges of vehicle functions associated with the selected first operating area are displayed in at least one of the plurality of second operating areas,
whereby, the selected, displayed tile is associated with the range of vehicle functions associated with the selected first operating area and at least one second operating area of the plurality of operating areas following exit of configuration mode,
wherein the method further comprises receiving, while in the configuration mode, a second user input selecting a first operating area or a second operating area and, in response thereto, allocating a range of vehicle functions associated with the selected first operating area or second operating area to the one tile.

2. The method of claim 1 further comprising, while in the configuration mode, in response to reception of the second user input for the first operating area or the second operating area for the purpose of allocating the range of vehicle functions, marking a position to which the range of vehicle functions would be allocated by a confirmation displayed on the graphical user interface.

3. The method of claim 2, wherein the marked position comprises a tile and/or a plurality of tiles which are adjacent to one another.

4. The method of claim 2, wherein the marking comprises:
coloring the marked position with a partially transparent color; and/or
edging the marked position with a frame; and/or
adapting color settings of the marked position.

5. The method of claim 1, wherein the first user input and/or the second user input is/are:
a tapping gesture; and/or
a drag and drop gesture; and/or
a two-finger zoom gesture.

6. The method of claim 1, further comprising, while in the configuration mode, receiving a third user input for the first operating area and, in response thereto, hiding the plurality of second operating areas thematically associated with the first operating area.

7. The method of claim 1, further comprising, while in the configuration mode, receiving a fourth user input and, in response thereto, displaying the plurality of first operating areas.

8. The method of claim 7, wherein the fourth user input comprises a long-press gesture with respect to the selected, displayed tile or comprises a vertical swipe gesture from an edge of the display.

9. The method of claim 1, wherein the first plurality of operating areas represent respective ranges of vehicle functions from the areas of:
music playback; and/or
routing; and/or
air-conditioning control; and/or
representation of information relating to trip statistics.

10. The method of claim 1, wherein the first plurality of first operating areas are provided in a movable band of adjacent operating areas which is extended with the second plurality of the second operating areas in response to the user's selection of a first operating area.

11. The method of claim 10, wherein two adjacent operating areas of the first plurality of operating areas are separated such that ranges of vehicle functions are grouped or hierarchically structured to facilitate selection to configure a tile.

12. The method of claim 1, wherein, prior to configuration mode, the one tile has no associated range of vehicle functions, and wherein, the detected user input triggering entry of configuration mode is detection of the user's hand touching the one tile by a tapping gesture.

13. A user interface comprising:
a processor; and
a touch screen for receiving user inputs,
wherein the processor displays a graphical user interface including a home screen customizable by a user,
wherein, in response to user input on the graphical user interface, the user interface enters a configuration mode for receiving user input selecting a displayed tile to allocate with a range of vehicle functions, wherein the selected, displayed tile is one tile of a plurality of displayed tiles displayed on the graphical user interface;
wherein, the processor, while in the configuration mode, displays a plurality of first operating areas, each of the first operating areas representing a respective range of vehicle functions;
wherein, the processor, while in the configuration mode, receives a first user input in relationship to the plurality of first operating areas selecting one of the plurality of first operating areas and, in response thereto,
while in the configuration mode, the processor displays a plurality of second operating areas each being thematically associated with the selected first operating area and the associated range of vehicle functions,
while in the configuration mode, the selection of the one of the plurality of first operating areas triggers input focus wherein current setting for the ranges of vehicle functions associated with the selected first operating area are displayed in at least one of the plurality of second operating areas,
whereby, the selected, displayed tile is associated with the range of vehicle functions associated with the selected first operating area and at least one second operating area of the plurality of operating areas following exit of configuration mode, and
while in the configuration mode, the processor receives a second user input selecting a first operating area or a second operating area and, in response thereto, allocating a range of vehicle functions associated with the selected first operating area or second operating area to the one tile.

14. The user interface of claim 13, wherein the user interface is permanently integrated in a transportation vehicle and displays sensor information from the transportation vehicle in a wired manner.

15. A non-transitory computer-readable medium comprising computer program code or a signal sequence representing computer program code which, when executed on a processor of a user interface, sets up the user interface for use to adapt a view on the display of the user interface by calling up a configuration mode for allocating a range of functions to one tile of a plurality of displayed tiles, which is displayed on the display, to display a first plurality of first operating areas representing a respective range of functions, to receive a first user input for the first operating area and, in response thereto, to display a second plurality of second operating areas thematically associated with the first operating area,
wherein the user interface includes the processor and a touch screen for receiving user inputs, wherein the processor displays a graphical user interface including a home screen customizable by a user, wherein, in response to user input on the graphical user interface, the user interface enters the configuration mode for receiving user input selecting a displayed tile to allocate with the range of functions, wherein the displayed, selected tile is one tile of the plurality of displayed tiles displayed on the graphical user interface, wherein, while in the configuration mode, the processor displays a plurality of first operating areas, each of the first operating areas representing a respective range of functions, while in the configuration mode, receives a first user input in relationship to the plurality of first operating areas selecting one of the plurality of first operating areas and, in response thereto, and displays a plurality of second operating areas each being thematically associated with the selected first operating area and the associated range of vehicle functions, and while in the configuration mode, the selection of the one of the plurality of first operating areas triggers input focus wherein current setting for the ranges of vehicle functions associated with the selected first operating area are displayed in at least one of the plurality of second operating areas,
whereby, the selected, displayed tile is associated with the range of vehicle functions associated with the selected first operating area and at least one second operating area of the plurality of operating areas following exit of configuration mode, and
wherein, while in the configuration mode, a second user input for selecting a first operating area or a second operating area is received, and, in response thereto, a range of vehicle functions associated with the selected first operating area or second operating area is allocated to the one tile.

16. A wireless communication device comprising a user interface that includes:
a processor; and
a touch screen for receiving user inputs,
wherein the processor displays a graphical user interface including a home screen customizable by a user in response to user input on the graphical user interface, wherein the user interface enters a configuration mode for receiving user input selecting a displayed tile to allocate with a range of vehicle functions, wherein the selected, displayed tile is one tile of a plurality of displayed tiles displayed on the graphical user interface;
wherein, the processor, while in the configuration mode, displays a plurality of first operating areas, each of the first operating areas representing a respective range of vehicle functions;
wherein, the processor, while in the configuration mode, receives a first user input in relationship to the plurality of first operating areas selecting one of the plurality of first operating areas and, in response thereto,
while in the configuration mode, the processor displays a plurality of second operating areas each being thematically associated with the selected first operating area and the associated range of vehicle functions, and
while in the configuration mode, the selection of the one of the plurality of first operating areas triggers input focus wherein current setting for the ranges of vehicle functions associated with the selected first operating area are displayed in at least one of the plurality of second operating areas,
whereby, the selected, displayed tile is associated with the range of vehicle functions associated with the selected first operating area and at least one second operating area of the plurality of operating areas following exit of configuration mode, and while in the configuration mode, the processor receives a second user input selecting a first operating area or a second operating area and, in response thereto, allocating a range of vehicle functions associated with the selected first operating area or second operating area to the one tile.

17. A vehicle comprising a wireless communication device including a display, a processor and an input for receiving user inputs, wherein the processor sets up the user interface for use to adapt a view on the display unit of the user interface by calling up a configuration mode for allocating a range of functions to one tile of a plurality of displayed tiles, which is displayed on the display unit, to display a first plurality of first operating areas representing a respective range of functions, to receive a first user input for the first operating area and, in response thereto, to display a second plurality of second operating areas thematically associated with the first operating area, wherein the wireless communication device includes a user interface that includes the processor and a touch screen for receiving user inputs, wherein the processor displays a graphical user interface including a home screen customizable by a user in response to user input on the graphical user interface, enters a configuration mode for receiving user input to allocate a range of vehicle functions to a displayed tile of a plurality of displayed tiles displayed on the graphical user interface;

wherein, the processor, while in the configuration mode, displays the plurality of first operating areas, each of the first operating areas representing a respective range of vehicle functions;

wherein, the processor, while in the configuration mode, receives the first user input in relationship to the plurality of first operating areas selecting one of the plurality of first operating areas and, in response thereto, while in the configuration mode, the processor displays the plurality of second operating areas each being thematically associated with the selected first operating area and the associated range of vehicle functions, and while in the configuration mode, the selection of the one of the plurality of first operating areas triggers input focus wherein current setting for the ranges of vehicle functions associated with the selected first operating area are displayed in at least one of the plurality of second operating areas, whereby, the tile is associated with the range of vehicle functions associated with the selected first operating area and at least one second operating area of the plurality of operating areas following exit of configuration mode, and while in the configuration mode, the processor receives a second user input selecting a first operating area or a second operating area and, in response thereto, allocating a range of vehicle functions associated with the selected first operating area or second operating area to the one tile.

* * * * *